United States Patent [19]

Webster

[11] 4,120,921
[45] Oct. 17, 1978

[54] METHOD FOR INJECTION MOLDING PLASTIC

[75] Inventor: Geoffrey R. Webster, Coopersburg, Pa.

[73] Assignee: Bethlehem Steel Corporation, Bethlehem, Pa.

[21] Appl. No.: 750,346

[22] Filed: Dec. 13, 1976

Related U.S. Application Data

[62] Division of Ser. No. 555,649, Mar. 5, 1975, Pat. No. 4,017,237.

[51] Int. Cl.² .............................................. B29F 1/00
[52] U.S. Cl. ..................................... 264/23; 264/297; 264/328

[58] Field of Search ................. 264/23, 297, 328, 329; 425/174.2, 562–566, 588, DIG. 224, DIG. 229; 164/49

[56] References Cited

U.S. PATENT DOCUMENTS

| | | | |
|---|---|---|---|
| 2,912,719 | 11/1959 | Gilmore et al. | 264/328 UX |
| 3,222,776 | 12/1965 | Kawecki | 164/49 |
| 3,807,921 | 4/1974 | Murgatroyd | 425/588 X |

Primary Examiner—Jan H. Silbaugh
Attorney, Agent, or Firm—Joseph J. O'Keefe; John I. Iverson

[57] ABSTRACT

A mold is provided with a pair of cavities interconnected by a runner to a common entry point. One of the cavities is gated whereby plastic may be injected into this cavity only by applying ultrasonic energy to the gate.

3 Claims, 5 Drawing Figures

METHOD FOR INJECTION MOLDING PLASTIC

This is a division of application Ser. No. 555,649 filed Mar. 5, 1975 now U.S. Pat. No. 4,017,237.

BACKGROUND OF THE INVENTION

This invention relates to the injection molding of plastics, and more particularly to a method and an apparatus for sequentially injection molding a plurality of thermoplastic parts in a single mold.

Injection molding machines are widely used in the production of thermoplastic parts. Such machines comprise a plasticizing chamber in which plastic molding powders are heated to form a viscous melt, a nozzle communicating between said chamber and a mold held between a pair of platens, and a piston or screw for applying pressure to the melt to force it through the nozzle and into the cavity of the mold.

A very large force must be exerted against the platens to hold the mold in place while the plastic is being injected therein. For example, for a medium size part such as a 50 centimeter diameter fan blade, this force may be about 180 to 360 tonnes (200 to 400 tons).

It would be desirable, from the standpoint of productivity, to provide a machine which could produce multiple parts rather than only a single part in the mold before the mold is opened and the part removed therefrom. However, if two parts, for example, are formed simultaneously, it has been found that the force required to prevent separation of the mold parting line is approximately twice that for a single part. Hence, a much larger and more expensive molding machine is required.

It is an object of this invention to provide a method and an apparatus for producing multiple thermoplastic parts without any increase in the force required to prevent mold separation.

SUMMARY OF THE INVENTION

We have discovered that the foregoing object can be obtained by providing a mold having at least two cavities therein, and connecting each of these cavities by a runner to a common entry point into the mold. At least all but one of the cavities is provided with an ultrasonic gate comprising a constriction orifice. For example, in a mold having three cavities therein, at least two of said cavities must be so gated. However, it is permissible and even desirable, in some cases, to ultrasonically gate all three cavities. Each gate permits the flow of plastic therethrough only when ultrasonic energy is applied thereto.

All, or all but one, of said cavities are maintained in the closed gate state and plastic material is then injected into the mold. Where one of the cavities is initially ungated, this cavity will be filled as soon as sufficient pressure is applied to the melt, while in the case of all the cavities being gated, one of said gates must be opened, by supplying ultrasonic energy thereto, to permit the respective cavity to be filled.

After the material in said one cavity has frozen, ultrasonic energy is sequentially supplied to each gate of the remaining cavities whereby plastic material is permitted to pass therethrough and into the respective gated cavity. The material in each filled cavity is permitted to freeze before ultrasonic energy is supplied to the next gate in the sequence.

DESCRIPTION OF THE PREFERRED EMBODIMENT

Figure 1:
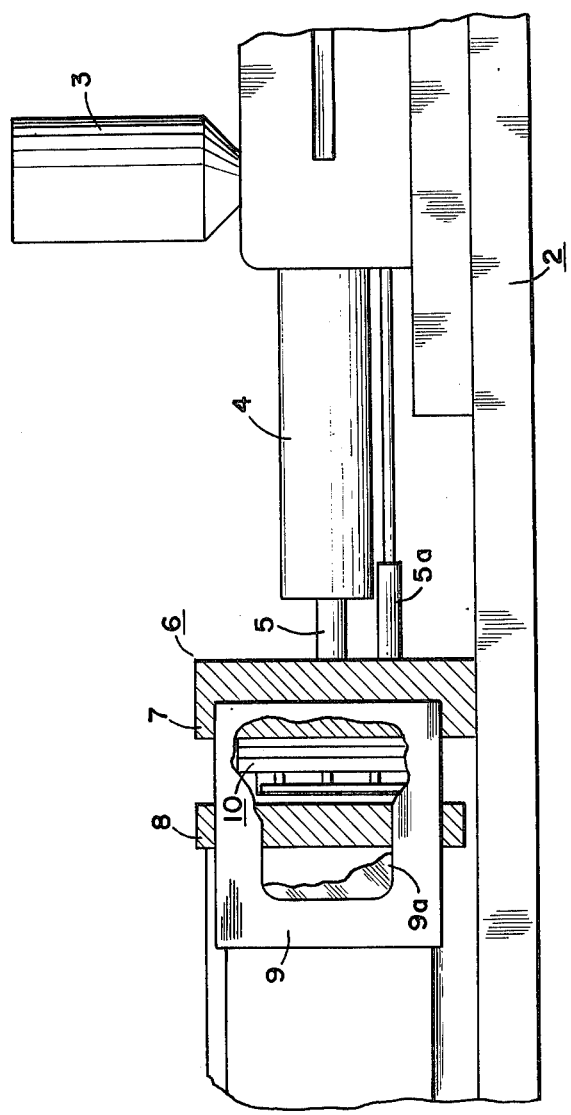
FIG. 1 is a diagrammatic view showing a mold in an injection molding machine.
Figure 2:
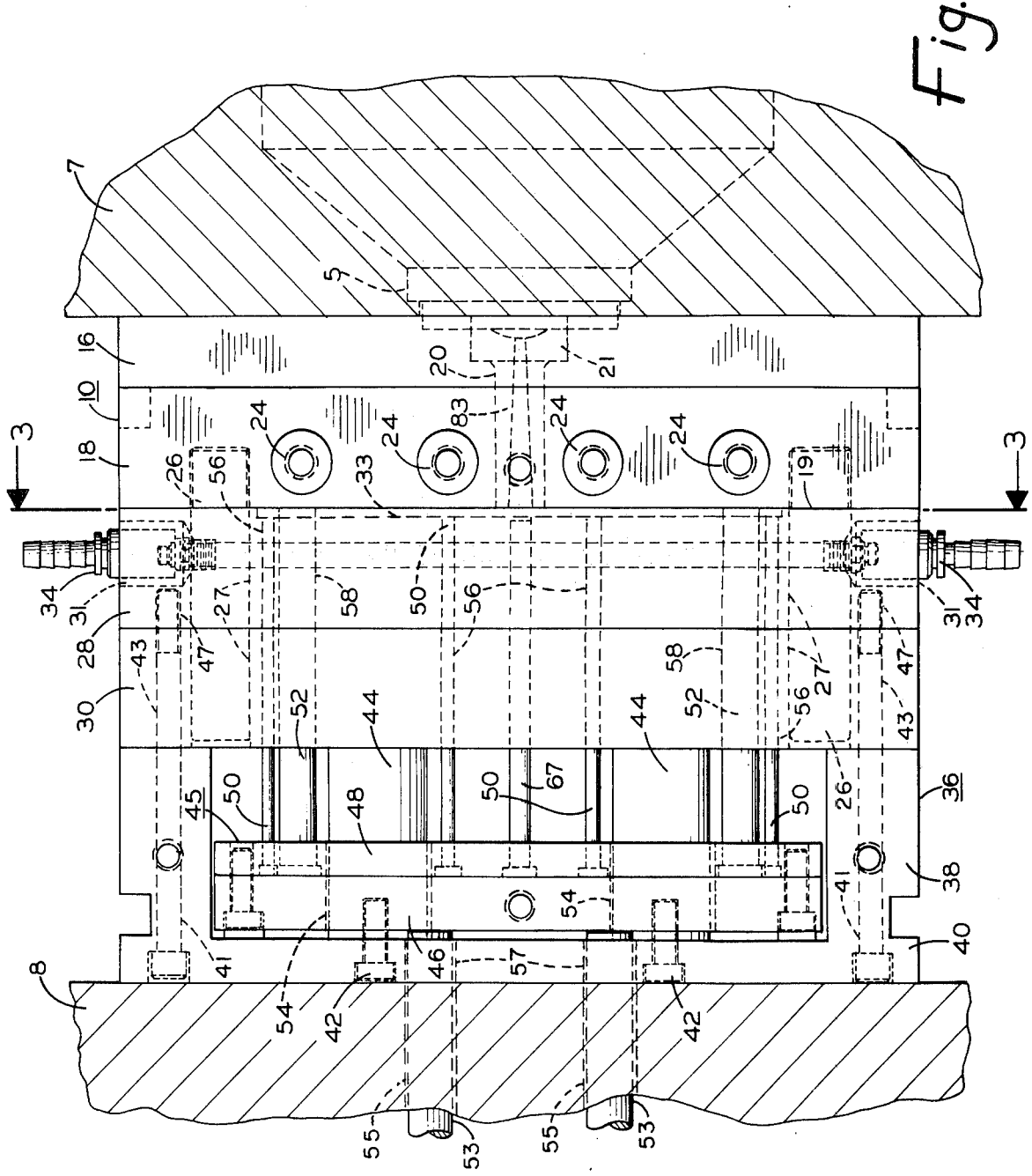
FIG. 2 is an enlarged side elevation view showing details of said mold in said machine.

As shown in FIG. 1, a conventional injection molding machine 2 broadly comprises a hopper 3 through which a supply of plastic pellets is fed to an extruder 4 slidably supported on ways (not shown). The front end of the extruder 4, which may be either of the screw or ram type, for example, comprises a nozzle 5 which abuts a press 6 comprising a stationary platen 7 and a movable platen 8. Pressure is applied to the nozzle 5 by actuating hydraulic cylinder 5a. The movable platen 8 has a protective shield 9, containing a glass observation window 9a, affixed thereto, and a mold 10 is adapted to be tightly held between said platens. Referring more particularly to FIG. 2, the mold 10 is shown as comprising a clamping plate 16 secured by machine screws, not shown, to a flat plate 18 one face of which defines the mold parting line 19, and which is known in the art as an "A" plate. The plates 16 and 18 are provided with a bore 20 to receive a sprue bushing 21, and the plate 18 is also provided with a plurality of longitudinal bores to receive coolant supplied through fittings 24.

Secured to plate 18 is a plurality of guide posts 26 which slidably engage bores 27 provided in plates 28 and 30, said plates being disposed on the opposite side of the mold parting line 19. The plate 28, known in the art as a "B" plate, contains the mold cavities 32 and 33, shown in detail in FIG. 3. The plate 30 is a support means for the "B" plate 28. A plurality of bore holes 31 is provided in plate 28 to receive coolant supplied through fittings 34.

The mold 10 also comprises an ejector housing 36 comprising side support plates 38 integral with a bottom plate 40. The plate 40, is secured to plates 28 and 30 by tie rods 41 which pass through bores 43 in plate 30 and engage threads 47 in plate 28. Plate 40, known in the art as a "C" plate, has secured thereto by machine screws 42, for example, a plurality of pillar blocks 44 which brace the "B" plate support plate 30. Within the ejector housing 36 is an ejector plate assembly 45, comprising an ejector plate 46 and an ejector retaining plate 48, to which is secured a plurality of ejector pins 50 and guide pins 52. The ejector plate assembly 45 is provided with bore holes 54 through which the pillar blocks 44 pass. The "B" plate 28 and the support plate 30 are provided with bore holes 56 and 58 through which the ejector pins 50 and the guide pins 52, respectively, are slidably fitted. A pair of knockout bars 53, slidably fitted in bore holes 55 and 57 in movable platen 8 and bottom plate 40, respectively, is provided for moving the ejector plate assembly 45 toward the mold cavities 32 and 33 to knock the finished parts therefrom.

Figure 3:
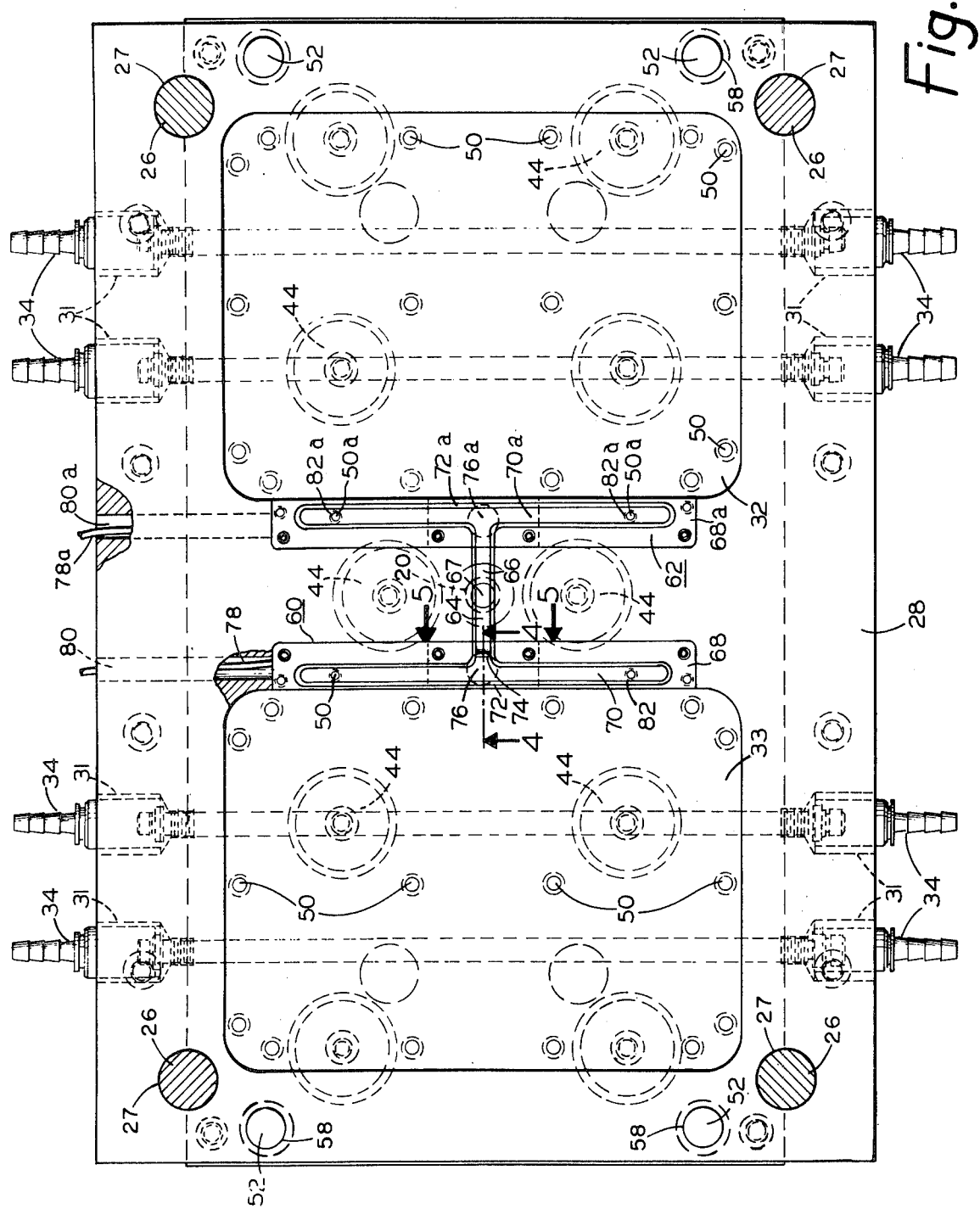
FIG. 3 is a plan view along the lines 3—3 of FIG. 2.
Figure 4:
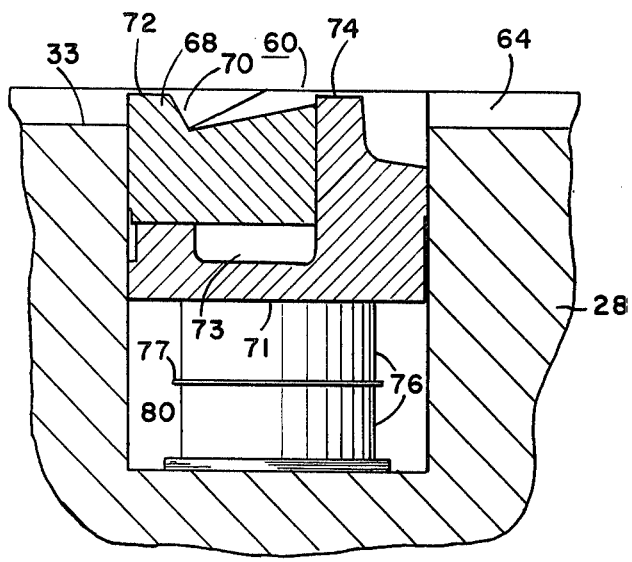
FIG. 4 is a detailed sectional view along the lines 4—4 of FIG. 3.
Figure 5:
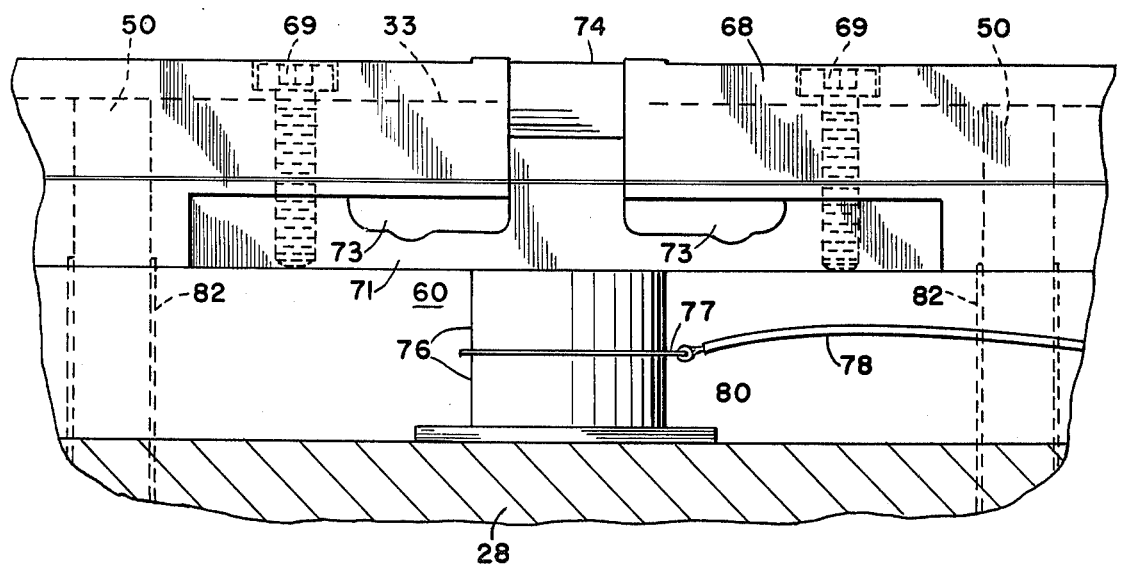
FIG. 5 is a detailed sectional view along the lines 5—5 of FIG. 3.

Two transducer gating assemblies 60 and 62, one of which is shown in detail in FIGS. 4 and 5, are shown in their relationship to the mold cavities 32 and 33 in FIG. 3. The transducer gating assemblies 60 and 62 are connected to runners 64 and 66, respectively, in the plate 28, connecting said assemblies to the sprue bushing bore 20. Under the bore 20 a sprue puller pin 67 is provided.

Referring to FIGS. 4 and 5, the transducer gating assembly 60 is shown as comprising a stationary steel block 68 secured by machine screws 69 to a vibratable steel block 71. The stationary block 68 is provided with a longitudinal groove 70 in which incoming plastic may spread laterally before spilling over a ledge 72 into the cavity 33. The vibratable block 71 is provided with openings 73 which permit the midpoint of the block 71, which is the location of a constriction orifice 74 through which the incoming plastic must flow to enter the cavity 33, to oscillate under the influence of ultrasonic energy. Such energy is supplied to the block 71 by means of a transducer affixed thereto. The transducer comprises a pair of piezoelectric crystals 76, connected through an electrode 77 to a source of power (not shown), e.g. a 100 watt, 20,000 Hertz supply, by means of wires 78 passing through a passageway 80 in the plate 28. The power supplied may vary from about 6 to 500 watts, depending on the size of the mold cavity. The frequency is not critical, and can be varied from about 15,000 to 60,000 Hertz. The groove 70 is provided with several bore holes 82 through which ejector pins 50 are slidably fitted.

Assembly 62 is identical to the above-described assembly 60, except that assembly 62 is not provided with a constriction orifice such as 74 in the present embodiment. Parts of assembly 62 identical to parts of assembly 60 are labeled in FIG. 3 with the postscript "a". Wires 78a for supplying power to assembly 62 are passed through passageway 80a.

The operation of the subject invention is substantially as follows. The mold 10 is closed and supported between the platens 7 and 8 of the press 6, and a sprue bushing 83 is inserted through the clamping plate 16 and "A" plate 18. The hydraulic cylinder 5a is then actuated to move the nozzle 5 of the injection molding machine 2 into place with the nozzle tip abutting the sprue bushing 83 with a large force, e.g. 3632 kilograms (8000 pounds). A thermoplastic, e.g. polystyrene, is then plasticized in the extruder 4 of the injection molding machine, and the plastic in the nozzle 5 is heated to a temperature of about 233° C. (450° F.). Meanwhile, a coolant is forced through the plates 18 and 28.

The plastic is then injected through the sprue bushing 83 and into the mold 10. Some of the plastic flows along runner 64 and stops at the constriction orifice 74, since the applied pressure on the plastic, which is about 7,031 tonnes per square meter (10,000 psi.), is insufficient to cause the plastic to flow through said orifice.

Plastic also flows through the runner 66, into and along the groove 70a, and spills over the ledge 72a into the mold cavity 32. The cavity fills in about 4 seconds, and the ram pressure of 7,031 tonnes per square meter (10,000 psi.) is maintained on the plastic during this time period, as well as during the subsequent 5 seconds, which interval is referred to in the art as the "pack" time. The plastic in the cavity 32, the groove 70a and the runner 66 then begins to cure, i.e. solidify.

After about 10 seconds of curing, the plastic is sufficiently solid that ultrasonic energy can be supplied to the crystals 76, thereby substantially reducing the resistance of the orifice 74 and also causing a rapid increase in the temperature of the plastic in the runner 64. Within about 2 seconds, the plastic flows from the nozzle 5 through the sprue bushing 83, along the runner 64 and through the constriction orifice 74. The plastic then fills the groove 70 and spills over the ledge 72 into the mold cavity 33. Power is continuously supplied to the crystals 76 until the plastic has packed. The power is then cut off and the plastic is permitted to cure. Thereafter, the mold halves are separated and the ejector plate assembly is actuated to remove the plastic parts from the mold.

While the invention has been described in connection with a mold having two cavities, only one of which is gated, the invention is broadly applicable to molds having a plurality of cavities therein. While all but one of the cavities must be gated, it is also possible to gate all of the cavities. This permits greater control over the operating parameters. For example, the flow rate of the plastic into the mold can be varied by varying the amount of ultrasonic energy applied to the gate.

I claim:

1. A method of injection molding a plurality of parts of plastic material comprising:
    (a) providing a mold having at least two cavities therein, each of said cavities being connected by a runner to a common entry point,
    (b) providing at least all but one of said cavities with a gate comprising a constriction orifice, each gate permitting the flow of said material therethrough only when ultrasonic energy is applied thereto,
    (c) maintaining all but one cavity in the closed gate state and injecting plastic material into said mold until the said one cavity is filled, and
    (d) after the material in said one cavity has frozen, sequentially supplying ultrasonic energy to the gate of each of the remaining cavities whereby plastic material in the constriction orifice increases rapidly in temperature and is permitted to pass therethrough and into the respective gated cavity, the material in each filled cavity being permitted to freeze before said energy is supplied to the next gate in the sequence.

2. A method as recited in claim 1, in which said mold contains two cavities only one of which is provided with said gate.

3. A method as recited in claim 1, in which said mold contains two cavities, both of which are provided with said gates.

* * * * *